(12) United States Patent
Holtan et al.

(10) Patent No.: US 9,393,978 B2
(45) Date of Patent: Jul. 19, 2016

(54) UTILITY MACHINE WITH DUAL-MODE STEERING

(71) Applicant: Dane Technologies, INC., Brooklyn Park, MN (US)

(72) Inventors: Paul Holtan, Savage, MN (US); Andrew Dvorak, Minnetonka, MN (US)

(73) Assignee: Dane Technologies, INC., Brooklyn Park, MN (US)

( * ) Notice: Subject to any disclaimer, the term of this patent is extended or adjusted under 35 U.S.C. 154(b) by 0 days.

(21) Appl. No.: 14/656,174

(22) Filed: Mar. 12, 2015

(65) Prior Publication Data

US 2015/0183449 A1 Jul. 2, 2015

Related U.S. Application Data

(63) Continuation of application No. 12/615,825, filed on Nov. 10, 2009, now Pat. No. 9,010,771.

(51) Int. Cl.
*B60B 33/02* (2006.01)
*B62B 3/00* (2006.01)
*B62B 5/00* (2006.01)
*B62B 5/06* (2006.01)

(52) U.S. Cl.
CPC ............... *B62B 3/001* (2013.01); *B62B 5/0026* (2013.01); *B62B 5/0079* (2013.01); *B62B 5/063* (2013.01); *B62B 2301/05* (2013.01)

(58) Field of Classification Search
CPC .............................. B62B 3/001; B62B 5/0026
USPC ............. 280/33.991, 33.992, 47.34; 16/18 R, 16/35 R, 35 D
See application file for complete search history.

(56) References Cited

U.S. PATENT DOCUMENTS

| | | | | | |
|---|---|---|---|---|---|
| 2,792,718 | A | * | 5/1957 | Ellison | 74/486 |
| 2,972,163 | A | * | 2/1961 | Ross et al. | 16/35 R |
| 3,409,105 | A | * | 11/1968 | Clinton | 188/29 |
| 3,557,893 | A | * | 1/1971 | Kohls | 180/332 |
| 3,620,549 | A | * | 11/1971 | Miller et al. | 280/99 |
| 3,828,392 | A | * | 8/1974 | Bolger | 16/35 R |
| 4,037,291 | A | * | 7/1977 | Huempfner | B60B 33/02 16/35 D |
| 4,205,413 | A | * | 6/1980 | Collignon | B60B 33/021 16/35 D |
| 4,790,610 | A | * | 12/1988 | Welch et al. | 312/218 |

(Continued)

FOREIGN PATENT DOCUMENTS

GB 1069643 * 5/1967 ............... B62D 1/14

*Primary Examiner* — Jeffrey J Restifo
*Assistant Examiner* — Erez Gurari
(74) *Attorney, Agent, or Firm* — Davis, Brown, Koehn, Shors & Roberts, P.C.; Sean D. Solberg

(57) ABSTRACT

An apparatus for transporting carts including a machine body, a steering control arranged on the body, a steering pedestal pivotally arranged with respect to the body, and a selection mechanism adapted to be selectively coupleable between the body and the steering pedestal providing for a caster mode and a steering mode respectively. A method of using a dual mode utility machine including depressing a first lever thereby engaging a pivoting selector into a steering pedestal engaging position and controlling the direction of the machine by rotatably manipulating a tiller, and depressing a second lever thereby disengaging the pivoting selector from a steering pedestal engaging position to a body engaging position and controlling the direction of the machine by pushing and/or pulling a machine from side to side via a fixed tiller.

20 Claims, 13 Drawing Sheets

(56) References Cited

U.S. PATENT DOCUMENTS

| | | | |
|---|---|---|---|
| 5,450,650 A * | 9/1995 | Bertrand | B60B 33/0068 16/35 R |
| 5,573,078 A * | 11/1996 | Stringer et al. | 180/19.2 |
| 5,791,669 A * | 8/1998 | Broddon et al. | 280/47.34 |
| 5,868,407 A * | 2/1999 | Roese | B62B 3/001 280/47.34 |
| 5,899,482 A * | 5/1999 | Kimura | 280/445 |
| 5,983,614 A * | 11/1999 | Hancock | A01D 75/28 16/35 R |
| 6,203,036 B1 * | 3/2001 | LaVaute et al. | 280/79.3 |
| 6,481,739 B1 * | 11/2002 | Newkirk | 280/484 |
| 6,575,052 B2 | 6/2003 | Toennesland et al. | 74/512 |
| 9,010,771 B2 * | 4/2015 | Holtan | B62B 3/001 280/33.992 |
| 2003/0141687 A1 * | 7/2003 | Wixted et al. | 280/47.35 |
| 2003/0231945 A1 * | 12/2003 | Weatherly | B62B 3/1404 414/604 |
| 2004/0134692 A1 * | 7/2004 | Kime | B62D 51/04 180/19.1 |
| 2004/0256166 A1 * | 12/2004 | Holtan | B60B 33/0007 180/65.51 |
| 2005/0116431 A1 * | 6/2005 | Holtan | B62B 3/1404 280/33.992 |
| 2006/0000664 A1 * | 1/2006 | Huang | A61G 5/047 180/198 |
| 2006/0102392 A1 * | 5/2006 | Johnson | A61G 7/08 180/19.1 |
| 2006/0197295 A1 * | 9/2006 | Holtan | B62B 3/1404 280/33.991 |
| 2006/0243500 A1 * | 11/2006 | Wiff | A61G 5/047 180/16 |
| 2007/0013157 A1 * | 1/2007 | Wiff | B60D 1/00 280/47.131 |
| 2007/0289787 A1 * | 12/2007 | Wiff | A61G 5/047 180/16 |
| 2009/0065272 A1 * | 3/2009 | Martin | B62B 5/0079 180/19.3 |
| 2010/0109268 A1 * | 5/2010 | Koehler | B62B 3/008 280/33.991 |
| 2015/0266342 A1 * | 9/2015 | Howard | A61G 1/0243 701/36 |

* cited by examiner

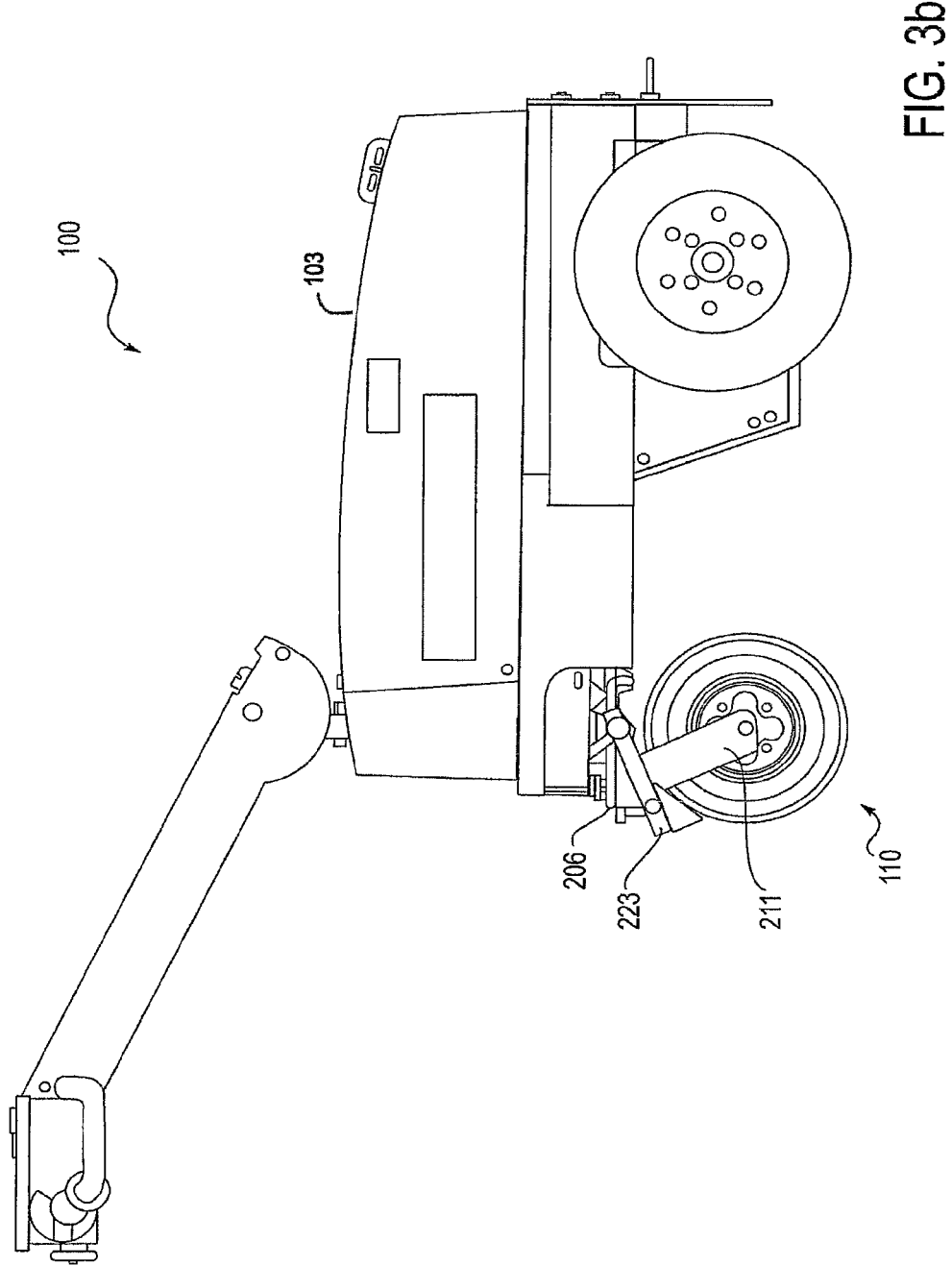

UTILITY MACHINE WITH DUAL-MODE STEERING

CROSS-REFERENCE TO RELATED APPLICATION(S)

This application is a continuation application of U.S. patent application Ser. No. 12/615,825, filed Nov. 10, 2009 which is incorporated herein by reference in its entirety.

FIELD OF THE INVENTION

The present disclosure relates to cart transporting apparatus and methods for assisting in the transport of wheeled carts. More particularly, the present disclosure relates to a utility machine with dual mode steering, and methods for making and using the same.

BACKGROUND OF THE INVENTION

Machines are often used to assist personnel with moving carts in warehouses, stores, or other commercial facilities. These machines are often referred to as utility machines. The machines can include a hitch for attaching to and pushing and/or pulling carts. The machines are often equipped with a tiller for steering the cart. For purposes of the present disclosure, a machine with a tiller can be said to be going forward when the machine is being pulled or led by the tiller. The opposing direction can be said to be the backward or reverse direction.

Generally, these utility machines include one of two types of steering systems. The first type may include one or more wheels turnable by the tiller or handlebar. The second type may include one or more caster wheels that follow the direction that the machine is pulled by a tiller secured to the machine similar to a child's wagon.

The first steering system often operates best in the forward or pulling direction, but can be difficult to backup for the inexperienced operator. That is, with a cart attached to the back end of the machine via a hitch, two pivot points exist-one pivot point at the steerable wheel (attached to the tiller) and one pivot between the machine and the cart. Steering the machine in the backward direction by the tiller indirectly changes the steering of the cart by first changing the angle of the steerable wheel. Then, as the machine moves, the body of the machine changes angle with respect to the cart, which then moves in a new direction. This backing process is akin to backing of a trailer with an automobile. While there may be a drawback in the ability to back a machine with this type of steering system, the control over the direction of the wheel can cause a machine with this steering system to have minimal steering response to hitch forces from the towed cart.

The second steering system can operate moderately well in the forward or reverse direction and can be easier to backup for the inexperienced operator. With a cart attached to the back end of the cart via a hitch a single pivot point exists between the machine and the cart. When backing, the tiller can be used to shift the front of the machine from side to side allowing the caster to follow. The change in the machine orientation directly changes the steering of the cart but in the opposite direction. That is, if the tiller side of the machine is shifted to the right causing the machine to head to the left, the attached cart will begin to head to the right. However, unlike the first steering system, this steering system can have a steering response to the hitch forces of the towed cart that can make operation somewhat difficult.

The presence of these two options forces those purchasing utility machines to make a choice regarding the type of steering system that will be most suitable for their particular application. This may be true even if their needs are for an application that requires both characteristics. Thus, there exists a need in the art for a utility machine with a more versatile steering system.

BRIEF SUMMARY OF THE INVENTION

The present disclosure, in one embodiment, discloses an apparatus for transporting carts including a machine body, a steering control arranged on the body, a steering pedestal pivotally arranged with respect to the body, and a selection mechanism adapted to be selectively coupleable between the body and the steering pedestal providing for a caster mode and a steering mode respectively. The selection mechanism may include a pivoting selector pivotally positionable between a body engaging position and a pedestal engaging position. The body engaging position may provide the caster mode and the pedestal engaging position may provide the steering mode. The body may further include a fixing element, the fixing element being engageable by the pivoting selector in a body engaging position.

In some variations of this embodiment, the fixing element may include a turn center plate. The turn center plate may further include a centering notch. The pivoting selector may include a body engagement feature adapted to engage the fixing element. The body engagement feature may also include a stepped feature adapted to engage the centering notch, and the pivoting selector may include a guide bar.

In other variations of this embodiment, the pivoting selector may include a pedal fixedly connected to the pivoting selector, wherein depressing the pedal positions the pivoting selector in the pedestal engaging position. A locking latch may be adapted to engage the pivoting selector. A pedal may be pivotally positioned on the steering pedestal, the locking latch being positioned on the pedal, such that depressing the pedal releases the pivoting selector. A biasing mechanism may be configured to bias the pivoting selector in a body engaging position such that depressing the pedal pivotally disengages the locking latch from the pivoting selector and the biasing mechanism causes the pivoting selector to rotate into the body engaging position.

In still further variations of this embodiment, the steering mechanism may include a tiller. The tiller may include a control interface. Furthermore, the steering pedestal may include a caster having a caster wheel and a caster yoke.

The present disclosure, in another embodiment, discloses an apparatus for transporting carts including a machine body, a steering control arranged on the body, a steering pedestal pivotally arranged with respect to the body, and a means for selectively coupling between a steerable mode and a caster mode, wherein the steerable mode includes coupling the steering control to the steering pedestal while allowing the each of the steering control and steering pedestal to rotate freely with respect to the body, and the caster mode includes coupling the steering control to the body to prevent rotation of the steering control while freeing the steering pedestal allowing free rotation of the steering pedestal. In variations of this embodiment, the means for selectively coupling may be pivotally positioned on the steering control and the steering pedestal is rotatably connected to the steering control.

The present disclosure, in a further embodiment, discloses a method of using a dual mode utility machine including depressing a first lever thereby engaging a pivoting selector into a steering pedestal engaging position and controlling the direction of the machine by rotatably manipulating a tiller, and depressing a second lever thereby disengaging the pivoting selector from a steering pedestal engaging position to a body engaging position and controlling the direction of the machine by pushing and/or pulling a machine from side to side via a fixed tiller. In variations of this embodiment, the pivoting selector may include a guide bar pivotally positioned on a yoke plate and adapted to selectively engage the steering pedestal or the body of the utility machine.

While multiple embodiments are disclosed, still other embodiments of the present disclosure will become apparent to those skilled in the art from the following detailed description, which shows and describes illustrative embodiments of the disclosure. As will be realized, the embodiments are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 2b is a rear view of the example tiller/front wheel assembly as in FIG. 2a;

FIG. 2c is a component view of the selection portion of the example tiller/front wheel assembly as in FIG. 2a;

FIG. 2f depicts an alternative guide bar for the tiller/front wheel assembly of FIG. 2a;

FIG. 3b is a right-side view of the example utility machine as in FIG. 3a configured in a steerable tiller mode;

DETAILED DESCRIPTION

The present disclosure relates to a utility machine with dual mode steering. The machine can be used to assist in moving carts in several settings including stores, distribution centers, warehouses, and other commercial settings. The dual mode steering may include a steerable wheel mode and a caster wheel mode. The steerable wheel mode may allow the direction of travel of a wheel to be controlled for purposes of steering the machine. The caster wheel mode may include a freely pivoting caster and the machine's direction may be physically manipulated for purposes of steering the machine.

Figure 1:
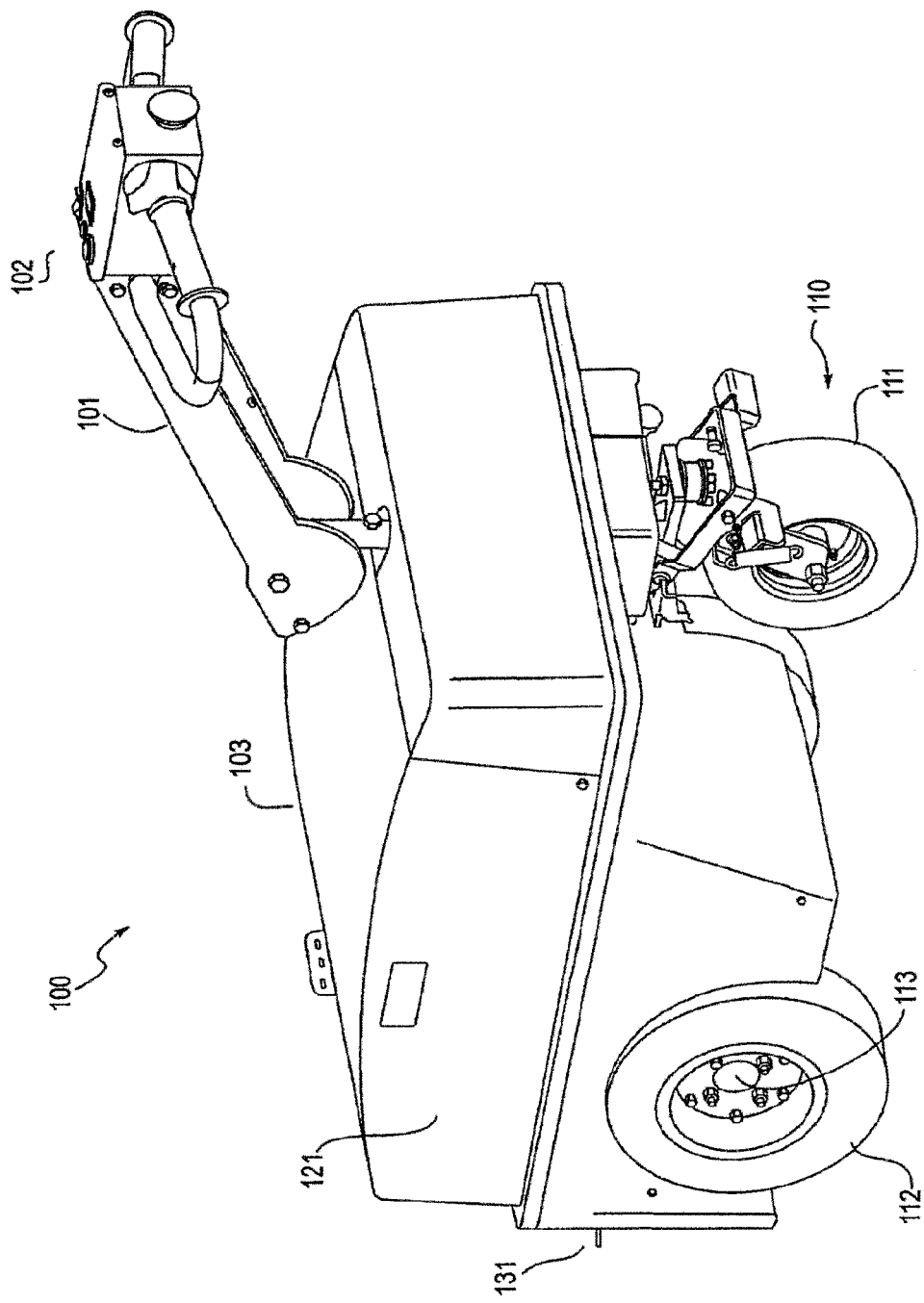
FIG. 1 is a side view of an example utility machine in accordance with the present disclosure.

Referring now to FIG. 1, a perspective view of a utility machine 100 is shown. The machine may include a machine body 103, a drive mechanism, a hitch 131, and a steering assembly. Additionally, a control system can be included for controlling several aspects of the utility machine.

In a preferred embodiment, and still referring to FIG. 1, the body 103 may include a frame and a housing 121. The hitch 131 may be included at a generally rear position of the body 103 of the utility machine 100 such that one or more wheeled carts may be attached thereto. The hitch 131 can be connected to the body 103 of the machine and can be adapted to latch, grasp, or otherwise engage a cart.

Also in the preferred embodiment, the drive mechanism can include a traction mechanism such as one or more driving wheels 112. Other traction mechanisms such as, for example a flexible track, can be included. The driving wheels 112 of the traction mechanism may be connected via a transaxle 113 at a generally rear position of the body 103 of the utility machine 100. The traction mechanism may be driven by a power source such as a motor or engine, which may be adapted to cause rotation of the transaxle 113 and thus rotation of the drive wheels 112. The power source may be electric, internal combustion, or any other known powering means.

With continued reference to the preferred embodiment, the control system can include a control interface 102 for controlling and/or monitoring the motor's operating characteristics, including on/off, speed, direction, battery, fuel, etc. The control interface 102 can include switches, buttons, levers, or other control elements for controlling a particular aspect of the utility machines operation. Additionally, the control interface 102 can include dials, gauges, and the like for monitoring the status of particular systems. The control system can include electronics associated with the interface for actuating or otherwise controlling particular corresponding valves, circuits, or other elements of the machines power source, steering control, or other controllable portions. Alternatively or additionally, the control interface 102 of the control system can be directly connected to valves, circuits, or other elements via cables, levers, or other connection elements. For example, a throttle control may be directly connected to the power source via a throttle cable and electronics may not be included for that particular control. The control interface 102 can be located in a suitable location on the utility machine to provide user access to the interface 102. In a preferred embodiment, the interface 102 can be located on a tiller 101.

Reference will now be made to FIG. 2a-2e for a discussion of a steering assembly 200 of the utility machine. The steering assembly 200 may include a steering control arranged on the body 103, and a steering pedestal pivotally arranged relative to the body 103. A selection mechanism may also be provided which may be selectively coupleable with the steering control, the body, and/or the steering pedestal providing for the steerable wheel mode and caster wheel mode described. In a preferred embodiment, the assembly 200 may be located at a generally front position of the utility machine body 103.

The steering control can be adapted for interfacing with a user and allowing the user to control the direction of the machine. Accordingly, the steering control can include one of several steering devices such as a tiller, a steering wheel, a joystick, or other manipulation elements for controlling steering. The steering control can include being remotely controlled where the steering control can include a remote control for handling by a user and an onboard steering mechanism in communication with the remote control. In this embodiment, manipulation of the remote control can actuate the steering mechanism thereby inducing pivoting in a steering pedestal. While being remotely controlled, this embodiment may also include handles on the body of the machine for use during a caster mode where the physical position or direction of the machine may be controlled directly.

Figure 2A:
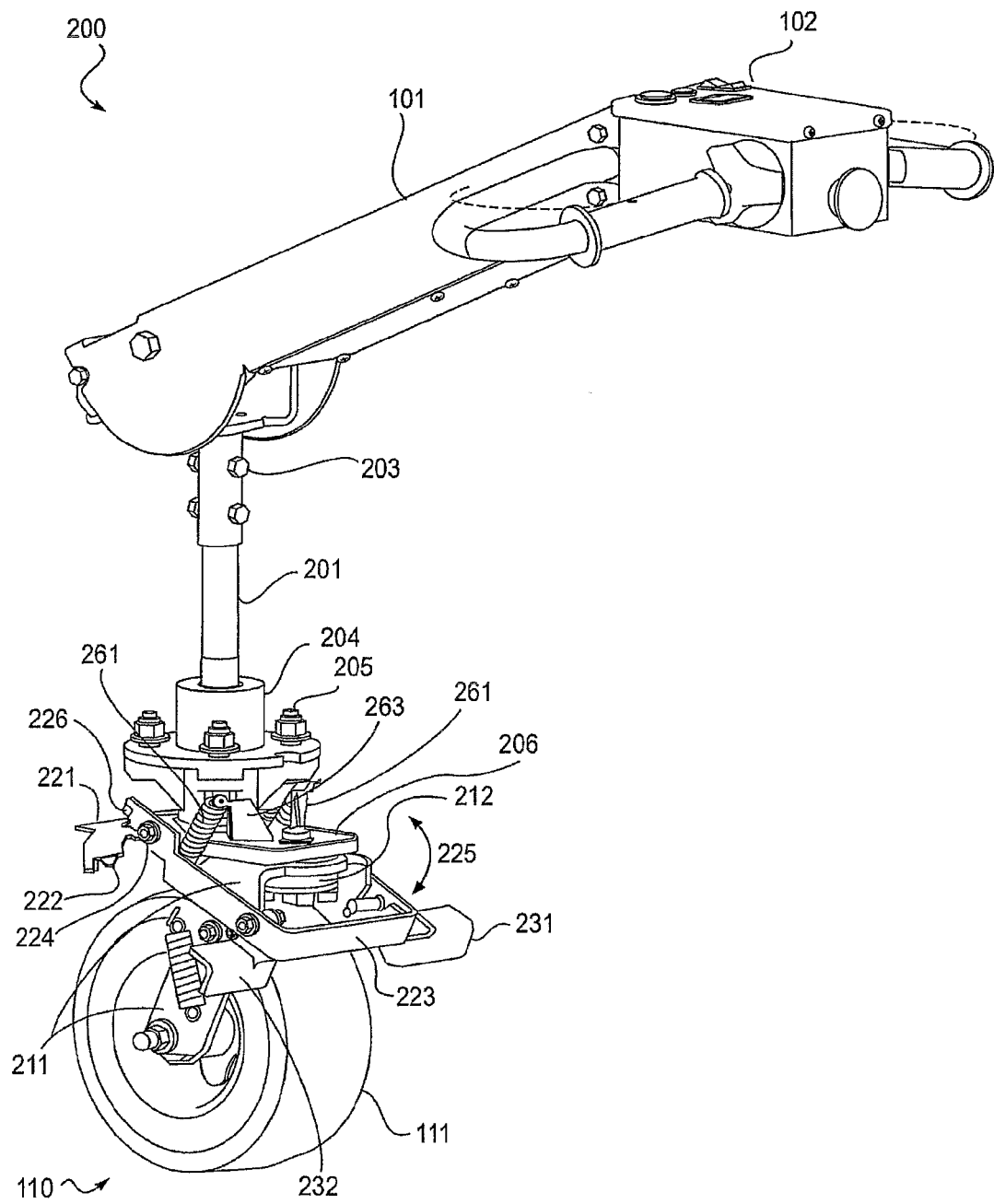
FIG. 2a is a front view of an example tiller/front wheel assembly m accordance with the present disclosure.

Referring to FIG. 2a, in a preferred embodiment, the steering control can include a tiller 101, a tiller yoke 201, and a yoke plate 206. The steering control can be adapted for manipulation by the user to control the direction of the utility machine. Depending on the condition of the selection mechanism (e.g., steerable wheel mode or caster wheel mode), manipulation of the steering control by the user may cause rotation of the steering pedestal or alternatively may cause reorientation of the machine where the steering pedestal follows.

Referring now to FIG. 2a the tiller 101 can extend from the body 103 of the machine and can be adapted for a user friendly position relative to the machine. That is, the tiller can be positioned between waist height and below chest height of a user. In some embodiments, the tiller may be pivotable relative to the body so as to allow a user to adjust the height of the tiller to a comfortable height based on the stature of the user. [037] Still referring to FIG. 2a, the preferred embodiment can include a tiller yoke 201. The tiller yoke 201 may be a tubular shaft, oriented in a generally vertical orientation. The tiller yoke 201 may be connected to the tiller 101 via a connection 203. The connection 203 may be rotationally fixed, but may allow the tiller 101 to pivot relative to tiller yoke 201. Accordingly, the connection 203 may be in the form of a U-shaped plate and the tiller 101 may form an opposing U-shape sized to fit snugly over the outside of the U-shaped plate. A bolt may be used to pass through the nested U-shapes thereby fixing the relative rotation of the tiller 101 and the yoke 201, but allowing the tiller 101 to be pivoted upward or downward relative to the yoke 201. Other rotationally fixed yet pivotal connections can be used.

The tiller yoke 201 can be connected to the body 103 of the machine such that the yoke 201 can rotate freely relative to the machine. This connection can be in the form of a bearing 204 adapted to maintain the tiller yoke 201 in a generally vertical position relative to the body 103 of the utility machine, while still allowing rotation about a vertical axis. The bearing can be a ball-bearing assembly or other type of bearing. The bearing 204 may be fixedly connected to the body 103 of the utility machine via a bolted connection. Other connections can be used including welding, screws or other fasteners, etc. The connection of the bearing 204 to the body 103 is depicted as reference numeral 205.

With continued reference to FIG. 2a, the steering control can also include a yoke plate 206. The yoke plate 206 can be fixedly connected to the tiller yoke 201 at a generally bottom position thereof and can be oriented perpendicularly to the vertical axis of the tiller yoke 201. The yoke plate 206 may be located just below the bearing 204 on the opposing side of the bearing 204 from the tiller 101. The yoke plate 206 can be a generally rectangular shaped plate and can have positioned thereon, several elements for interaction with the steering pedestal and the selection mechanism. In the preferred embodiment shown, the yoke plate 206 can include stand-off brackets 263 and mounting brackets 265 for engagement by a biasing mechanism and guide bar respectively of the selection mechanism.

The several parts of the steering control can all be rotationally connected as described. While some are fixed and some allow for pivoting motion between the parts, the steering control can rotate as a unit when the tiller is manipulated by the user. That is, if the tiller 101 is rotated, the yoke 201 and yoke plate 206 will follow.

Figure 2B:
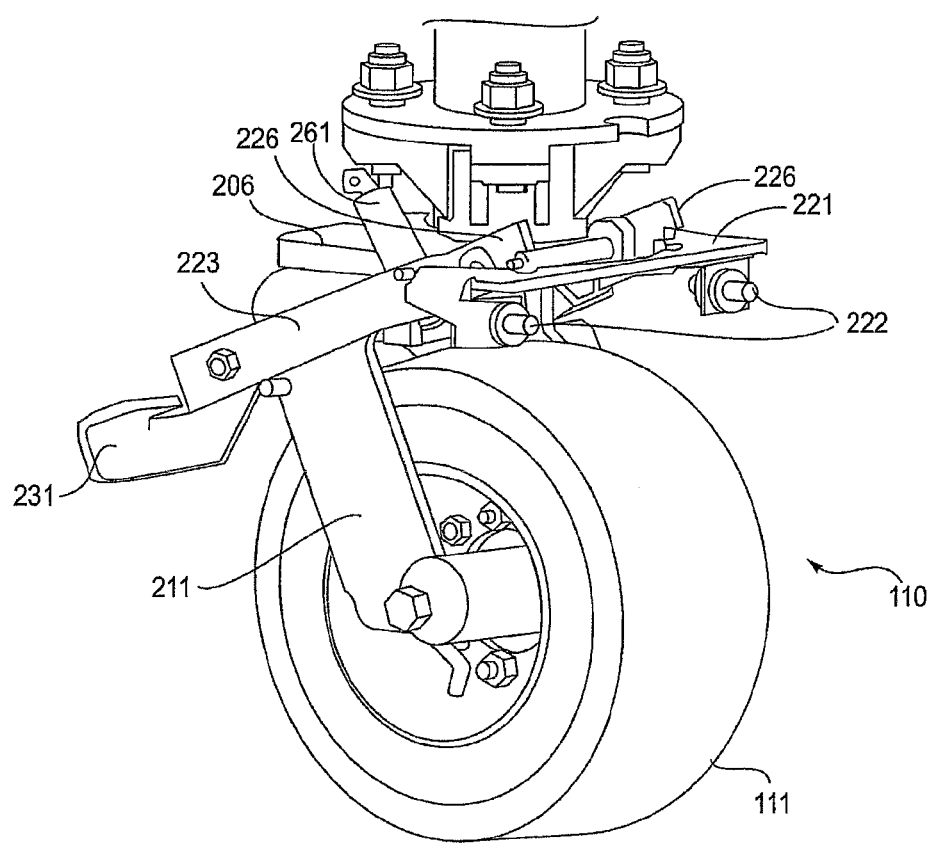

As mentioned, the steering assembly 200 can also include a steering pedestal. The steering pedestal can be adapted for interfacing with a surface allowing for pivotable steering of the machine. Accordingly, the steering pedestal can include one of several surface engaging steering elements such as a wheel, a ski, a rudder, or other surface engaging steering elements for performing steering. The steering pedestal can be pivotally arranged and yet translationally fixed relative to the body 103. As such, when in a steerable wheel mode, the steering pedestal can be rotated and when the machine is advances or reversed, the pedestal can track in its rotated direction causing the body 103 to follow. In caster wheel mode, the reverse is true. That is, motion of the body 103 in a particular direction can cause the rotated position of the pedestal to change to accommodate the body 103 direction. Referring to FIG. 2b, a preferred embodiment of a steering pedestal is shown in the form of a caster 110. The caster 110 can include a freely pivotal wheel 111, a caster yoke 211, and a caster bearing 212. The wheel 111 can be pivotally connected to the caster yoke 211. The caster yoke 211 may generally have two side portions connected by a connection plate and extending there from along each side of the wheel 111 to the center of the wheel 111. A bolt or other similar connection means can pass from one side portion, through the center of the wheel 111, to the other side portion and can serve to pivotally secure the wheel 111 in the caster yoke 211 allowing free rotation about a horizontal axis of the wheel 111. The caster bearing 212 can be adapted for connecting the caster 110 to a movable device or machine. In the preferred embodiment, the bearing 212 can be positioned on the connection plate of the caster yoke 211 and can be secured to the connection plate via a hole in the connection plate. The bearing can also be secured to a surface of the yoke plate 206 opposite the yoke 201. A mounting location can also be provided on the caster yoke 211 for mounting a latch.

It is also noted that the two side portions and the connection plate of the caster yoke 211 can form a generally U-shaped element. Additionally, the U-shaped element can be skewed slightly as shown in FIG. 2b, such that translational forces applied via the bearing 212 to the connection plate will cause rotation about a vertical axis of the caster 110 so as to cause the caster 110 to track with the machine when the machine orientation is changed. Additionally, it is to be appreciated that the caster 110 can be secured to the machine in several positions and may not be secured to the yolk plate 206 of the steering control. The steering assembly 200 can also include a selection mechanism. The selection mechanism can be adapted to control the relationship between the steering control and the steering pedestal and the relationship between the steering control and the body. Accordingly, the selection mechanism can include one or more devices for engaging the several devices in one or more combinations and can include toggling levers, pins, or other movable parts for engaging and disengaging suitable parts and creating relative motion relationships there between. Where the machine is in steerable wheel mode, the selection mechanism may be adapted to create an engagement between the steering control and the steering pedestal and yet allow rotation of the steering control relative to the body. Where the machine is in caster wheel mode, the selection mechanism may be adapted to create an engagement between the steering control and the body and yet allow free rotation of the steering pedestal.

For example, in a preferred embodiment, the selection mechanism may include a pivoting selector pivotally connected to the steering control and positionable between a body engaging position and a pedestal engaging position. In this embodiment, the body 103 can include a fixing element fixed to the body 103 and the body engaging position may include pivoting the pivoting selector such that a portion of the pivoting selector comes into contact with the fixing element thereby preventing the relative rotation of the steering control relative to the body. This position may also allow free rotation of the steering pedestal. Pivoting the pivoting selector to an alternative position may engage the steering control with the steering pedestal and free the steering control from rotationally restraint relative to the body 103.

More particularly, the preferred embodiment of a selection mechanism on a steering assembly 200 will be described with reference now to FIGS. 2a, 2b, and 2c. In the preferred embodiment, the pivoting selector can be in the form of a guide bar 223 and the fixing element can be in the form of a turn center plate 221. The selection mechanism can also include a locking latch 251 and a biasing mechanism 261.

Figure 2C:
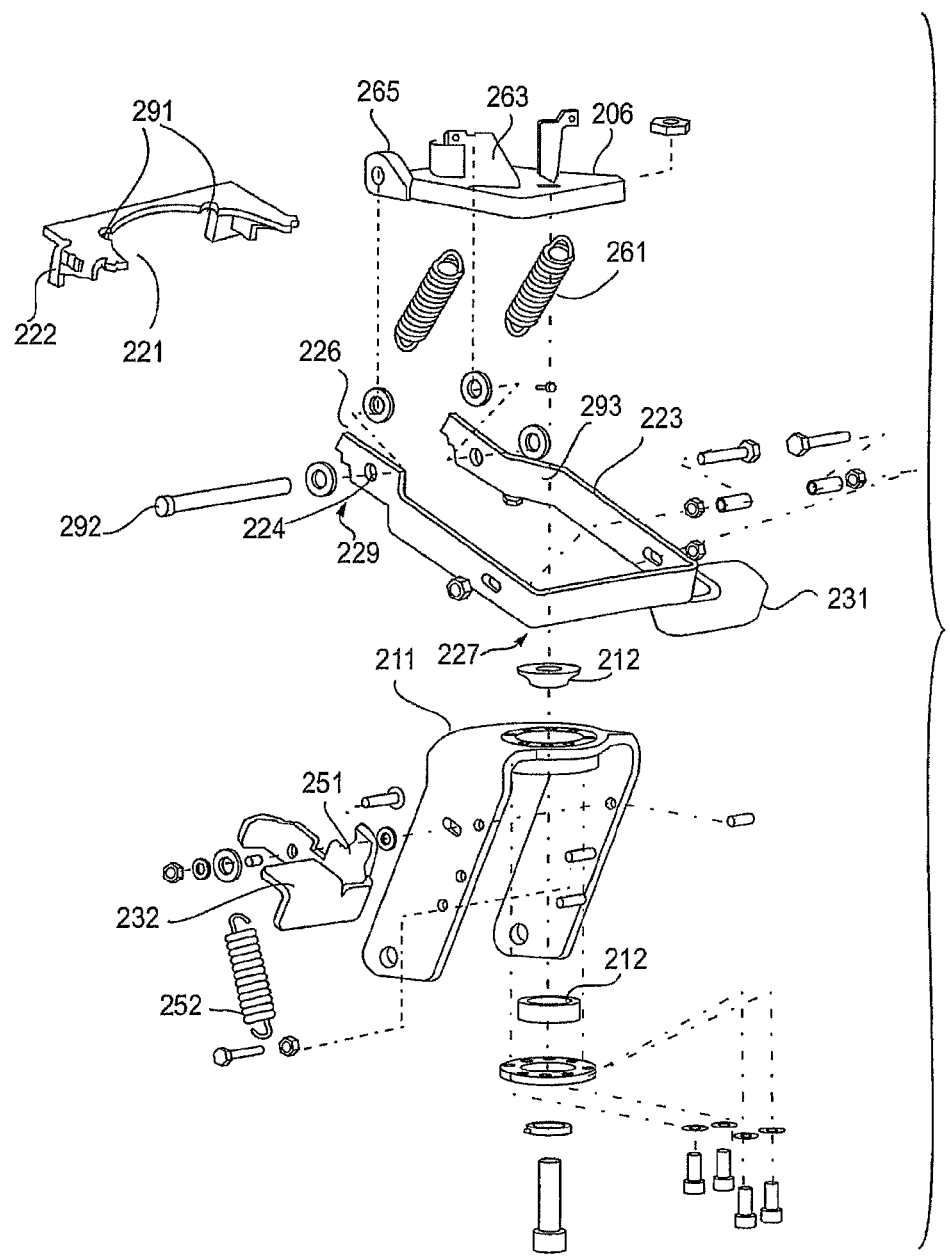

Referring to FIG. 2c, the turn center plate 221 is shown. As depicted, the turn center plate 221 may be a generally flat plate having one generally flat edge, and one generally curved edge. The generally flat edge may be adapted to be positioned flush along a surface of the body 103 of the machine. The generally curved edge may be positioned more proximate to the yoke plate 206 relative to the flat edge. The generally curved edge may have a relatively constant radius with a center point positioned at the center of the tiller yoke 201. Additionally, the generally curved edge may have one or more centering notches 291 indented therein. In one embodiment, the centering notches may be generally aligned with opposing sides of the yoke plate 206. The turn center plate 221 may include a connection flange 222 for connection of the turn center plate 221 to the body 103 of the utility machine. Bolts, screws, welding, or other fastening techniques can be used to secure the turn center plate to the body 103. The turn center plate may be positioned on the body 103 at a position generally in line with the yoke plate 206.

With continued reference to FIG. 2c, the guide bar 223 may be a generally u-shaped element including two legs and a crossbar. The guide bar 223 may have a relatively broad latch end 227 and a relatively narrow pivot end 229 with a tapered region there between where the legs of the guide bar converge from the latch end 227 to the pivot end 229. The latch end 227 may be sized slightly larger than the width of the caster yolk 211 such that each leg of the latch end 227 can nest tightly adjacent each side of the caster yolk 211. The pivot end 229 may be sized slightly larger than the width of the yoke plate 206 such that each leg of the pivot end 229 can pass by the edge of the yoke plate 206. Each leg of the guide bar 223 can include a securing hole 224 for attaching the guide bar 223 to the yoke plate 206, the securing hole 224 positioned near the terminus of both pivot ends of the guide bar 223, as depicted in FIG. 2c. The guide bar 223 can be positioned such that the securing holes 224 are in alignment with holes in the mounting brackets 265 of the yoke plate 206 and a connector can be positioned there through, the holes 224 and connector defining a pivot point. This connector may be a bolt or other suitable securing means that allows the guide bar 223 to remain free to pivot about a horizontal axis at the pivot point and yet prevents rotation of the guide bar 223 relative to the yoke plate 206 due to the connector being positioned in mounting brackets on opposing sides of the yoke plate 206. More generally, the latch end 227 of the guide bar 223 may pivot "up and down" as indicated by the arrow 225 in FIG. 2d. In a fully "up" angular orientation, the guide bar 223 may be parallel to the plane of the yoke plate 206 and the turn center plate 221. In a fully "down" angular orientation, the angle between the plane of the guide bar 223 and the plane of the yoke plate 206 and the turn center plate 221 may be generally greater than zero degrees, but generally less than 90 degrees.

As shown best in FIG. 2a, a biasing mechanism 261 can extend from the stand-off brackets 263 on the yoke plate 206 to the guide bar 223. The biasing mechanism may be attached to a point on the guide bar 223 that is positioned toward the latch end 227 of the guide bar 223 from the pivot point. Accordingly, the biasing mechanism can cause the guide bar 223 to be biased to the fully "up" angular orientation.

At the terminus of both ends of the legs of the guide bar 223, a body engagement feature may be provided. The body engagement feature may be adapted to engage the body or a fixing element positioned thereon. Accordingly, the body engagement feature can provide a stop point for the rotation of the guide bar 223 so as to provide a limit to the downward rotation of the pivot end 229 and correspondingly a limit on the upward rotation of the latch end 227.

In the preferred embodiment, the body engagement feature can include an irregularly shaped end adapted to engage the notches 291 of the turn center plate. As shown, the pivot end 229 of the legs of the guide bar 223 can be stepped one or more times such that the pivot ends 229 have a lesser depth than the rest of the guide bar 223. The stepped end 226 can include a single step, a double step as shown, or additional steps. Due to the previously discussed spacing of the centering notches 291 and the size of the pivot end of the guide bar 223, the stepped ends of the guide bar 223 can align with the notches and be adapted to engage the notches.

Figure 2D:
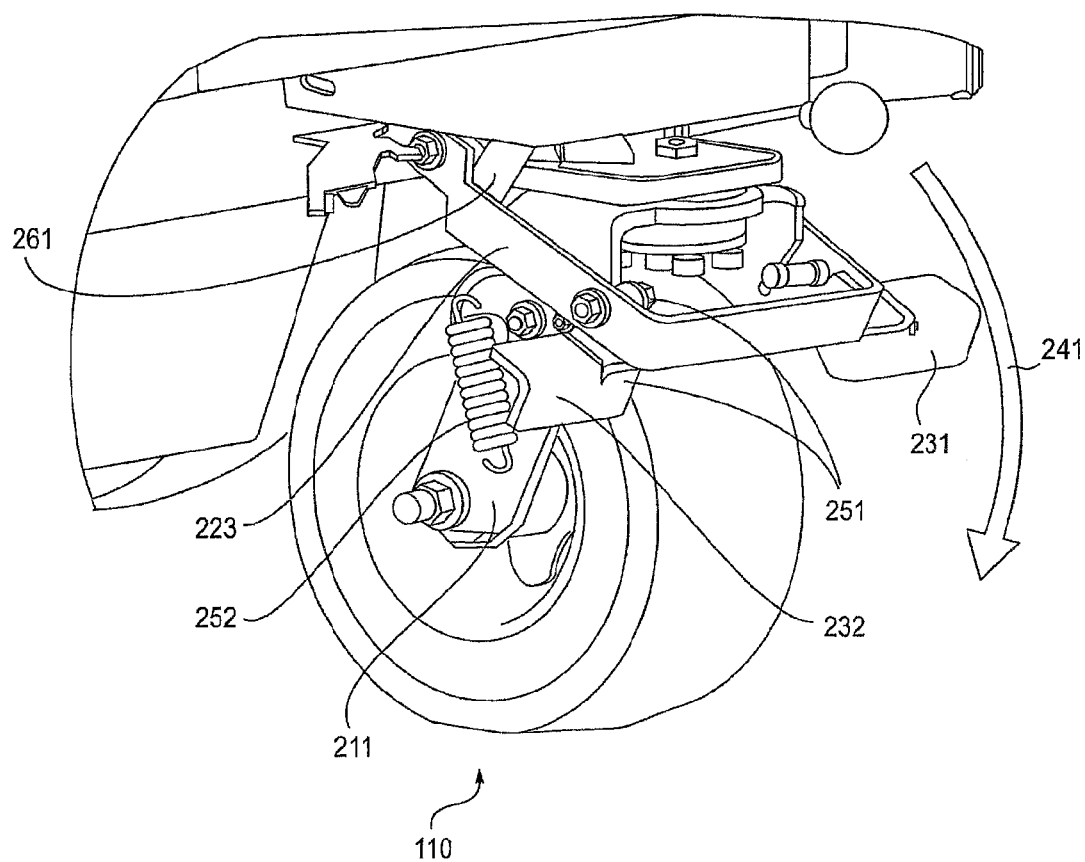
FIG. 2d depicts a procedure for configuring a utility machine into a steerable tiller mode in accordance with the present disclosure.
Figure 2E:
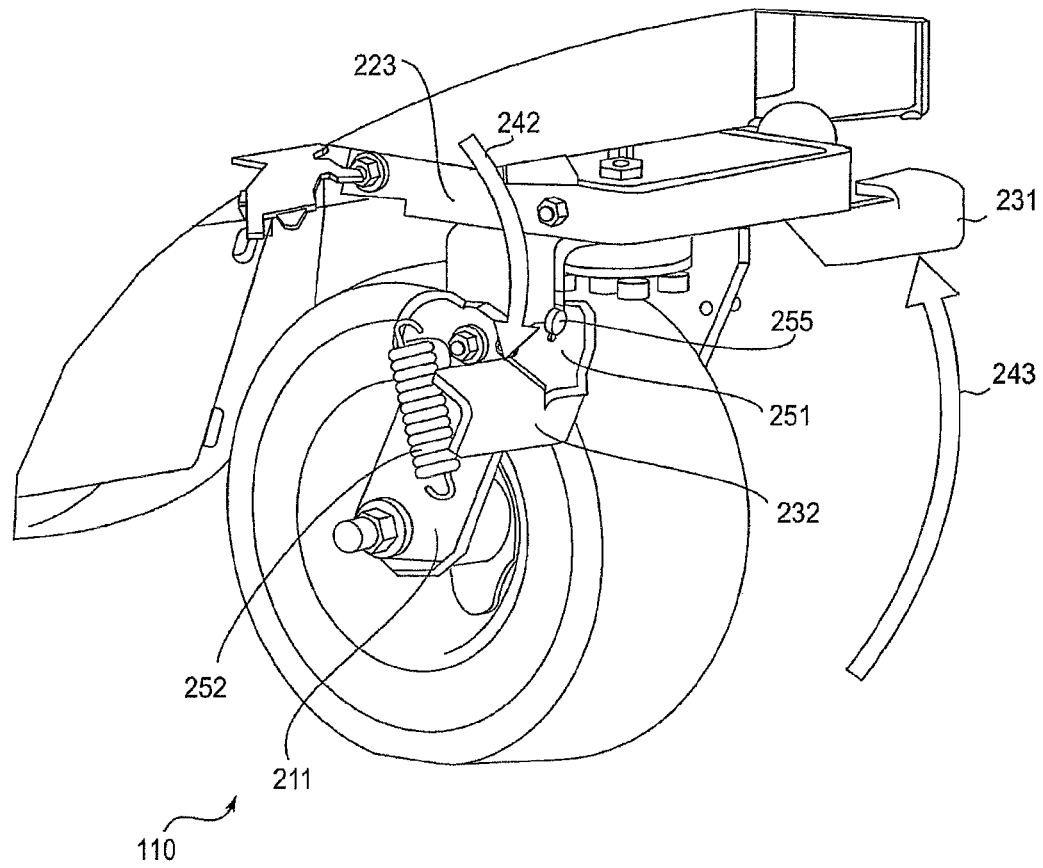
FIG. 2e depicts a procedure for configuring a utility machine as in FIG. 2d into a fixed tiller mode.
Figure 2F:
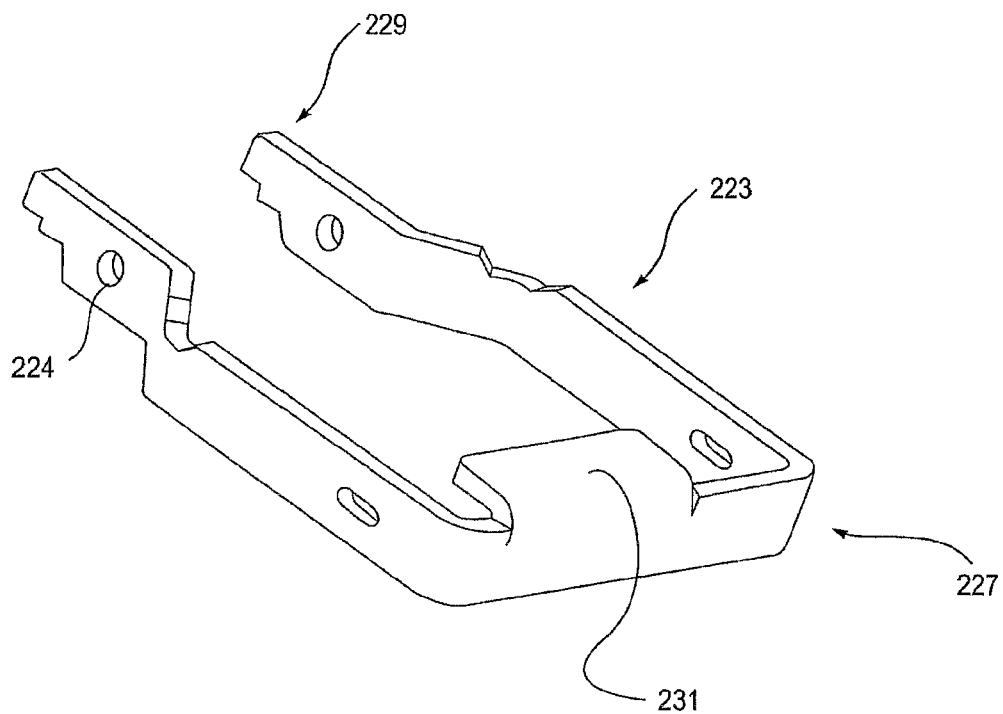

Referring to FIG. 2c, a pedal 231 may be immovably connected to the guide bar 223. The pedal 231 can have a relatively flat upper surface so as to be easily actuatable with a user's foot. Additionally, the pedal 231 can extend laterally from the guide bar 223 so as to expose the pedal 231 and allow it to be depressed by a user. As is evident from the figures, depressing the pedal 231 can cause the latch end 227 of the guide bar 223 to pivot downward and lift the stepped ends 226 of the guide bar 223 out of engagement with the turn center plate 221. In the embodiment shown, the pedal 231 is a right-hand pedal, which extends to the right relative to a person facing the machine from at the tiller location. Alternative locations of the pedal 231 can be used. For example, as shown in FIG. 2f, an alternative pedal location is shown, where the pedal 231 is generally centered on the crossbar. The pedal 231 can extend inwardly toward the steering pedestal as shown or, alternatively, away therefrom.

With continued reference to FIG. 2c, a latch pedal 232 may be rotatably connected to the left side of the caster yoke 211 at the mounting location. The latch pedal 232 may include a relatively flat upper surface so as to be easily actuatable with a user's foot and can extend laterally from the caster yoke 211 so as to expose the pedal 232 allowing it to be depressed by the user. In the embodiment shown, the latch pedal 232 is a left-hand pedal extending to the left relative to a person facing the machine at the tiller location. Alternative locations of the pedal 232 can be used.

The latch pedal 232 can have an extension arm extending rearward from the pedal surface and including a mounting hole for pivotally mounting the pedal to the caster yoke 211 providing for pivotal motion about a horizontal axis. The extension arm can extend beyond the mounting hole and an anchoring point can be provided. A biasing mechanism can be included and can extend from an anchor point on the caster yoke 211 to the anchoring point on the extension arm. As shown, the latch pedal 232 can thus be biased in an upward direction.

Extending from the latch pedal 232 is a locking latch 251. With reference to FIG. 2c, the locking latch 251 may extend vertically from the latch pedal 232, and have a generally hooked shape with the point of the hook facing generally rearwardly and poised to engage a locking pin extending inwardly from the inside face of the guide bar 223. The locking latch 251 may be integral with the latch pedal 232 so as to be biased in an upward position along with the pedal 232. Accordingly, when a user depresses the pedal 231 forcing the latch end 227 of the guide bar 223 to pivot downward, the locking pin may engage the point of the hook causing the latch pedal 232 to pivot downward against the biasing force. As will be appreciated, the downward rotation of the pedal 232 can cause a slight frontward motion of the point of the hook allowing the locking pin to clear the point of the hook. Once cleared, the biasing force on the latch pedal 232 can cause it to return toward its biased position thereby nestling the hook around the locking pin of the guide bar 223 and holding the guide bar 223 in the pivoted down position.

The utility machine 100 as depicted in FIGS. 2a-c may operate in either a caster wheel mode or a steerable wheel mode. These two modes can be determined by the position of the guide bar 223. When the guide bar 223 is rotated to the aforementioned parallel or "up" position, the pivot ends 229 of the guide bar 223 may come into contact with the centering notches 291 on the curved front edge of the turn center plate 221 thereby preventing relative rotation between the yoke plate 206 and the body 103. That is, engaging the guide bar 223 with the turn center plate 221 can prevent relative rotation there between. Since the guide bar 223 is fixed against rotation relative to the yoke plate 206, the fixed condition of the guide bar 223 also fixes the condition of the yoke plate 206. Alternatively, when the guide bar 223 is rotated into the aforementioned angled or "down" position, the pivot ends 229 of the guide bar 223 may be removed from contact with the turn center plate 221 such that the guide bar 223 may be free to rotate about a vertical axis relative to the turn center plate 221. Furthermore, as the guide bar 223 is rotated downward out of the plane of the yoke plate 206, it may come into direct contact with the sides of the caster yoke 211. This engagement of the guide bar 223 with the caster yoke 211 can function to prevent relative rotation of the caster yoke 211 relative to the yoke plate 206. That is, while the guide bar is pivotal relative to the yoke plate 206, it is not rotatable relative thereto. As such, when pivoted downward and engaging the caster yoke 211 the guide bar 223 functions to rotatably tie the caster yoke 211 to the yoke plate 206.

In a steerable wheel mode, the tiller 101 may be operably connected to a caster 110 such that a change in the angle of the tiller 101 relative to the body 103 of the utility machine 100 causes a corresponding change in the angle of the caster 110 relative to the body of the utility machine 100. To facilitate steerable wheel mode, as shown in FIG. 2d, the pedal 231 can be depressed thereby rotating the latch end 227 of the guide bar 223 downward and engaging the locking latch 251, which can function to maintain the guide bar 223 in the downward position. As discussed, this position of the guide bar can tie the caster yoke 211 to the yoke plate 206 and can free the yoke plate for relative rotation relative to the body 103. Additionally, as described above, the yoke plate 206 can follow with the position of the tiller 101 due to the several connections between the tiller 101 and the yoke plate 206. Accordingly, rotation of the tiller 101 by a user can cause rotation of the caster 110 due to its position within the caster yoke 211.

In a caster wheel mode, the tiller 101 may be locked in a fixed position relative to the body 103 of the utility machine 100, and the caster 110 may freely rotate relative to the body of the utility machine 100. Accordingly, pulling the machine from side to side using the tiller 101 can cause the caster 110 to follow the direction the machine is pulled or pushed. To facilitate caster wheel mode, as shown in FIG. 2e, the latch pedal 232 can be depressed to release the locking latch 251 from the locking pin on the guide bar 223. The biasing mechanism which biases the guide bar 223 to the upward position can then pivot the guide bar 223 to its upward position causing the pivot end of the guide bar 223 to engage the top surface of the turn center plate 221. Where the pivot ends 229 are aligned with the notches 291 in the plate 221 the stepped ends 226 may engage the notches 291. Where the pivot ends 229 are not aligned with the notches 291, the stepped ends 226 may contact the top surface of the turn center plate 221, but be free to slide across the top surface. Once the yoke plate 206 is turned via rotation of the tiller 101, the pivot ends of the guide bar 223 may then align with the notches 291 of the turn center plate 221 and snap into place due to the biasing force on the guide bar 223. Accordingly, and as discussed above, this condition can function to fix the rotation of the yoke plate relative to the body 103 of the machine. It is noted that the position of the centering notches 291 in this embodiment, thus function to fix the tiller position only when it is directed forwardly, which is suitable for using the machine in caster wheel mode. Concurrently with the pivot ends 229 of the guide bar 223 snapping into place on the turn center plate 221, the latch end 227 of the guide bar 223 may be lifted free from its surrounding position on the caster yoke 211 thereby freeing the caster 110 and allowing free pivoting motion of the caster 110. As such, the tiller 101 is fixed against rotation and the caster 110 is free to rotate thus establishing the caster wheel mode of the machine.

Figure 3A:
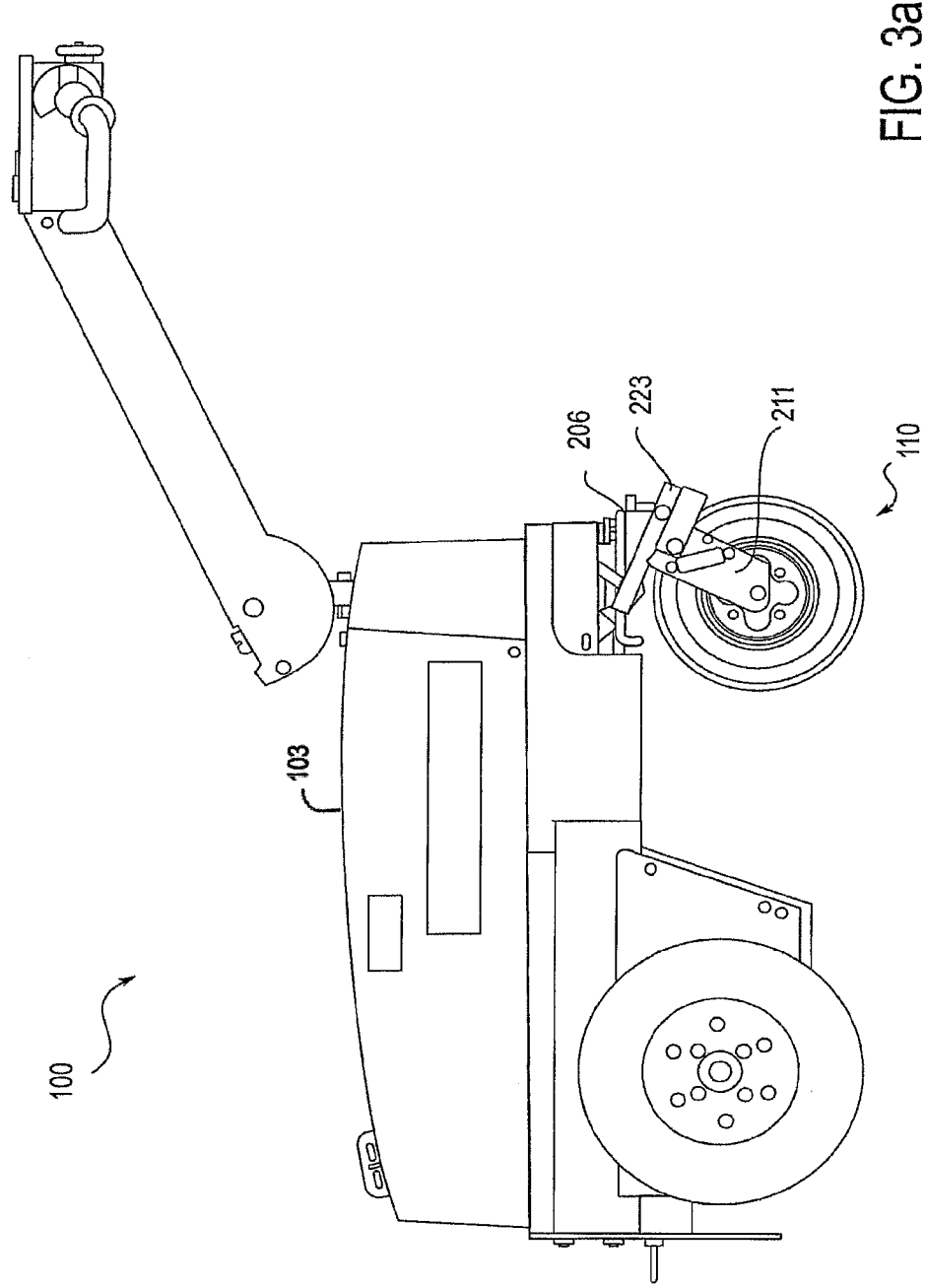
FIG. 3a is a left-side view of an example utility machine configured in a steerable tiller mode in accordance with the present disclosure.
Figure 3C:
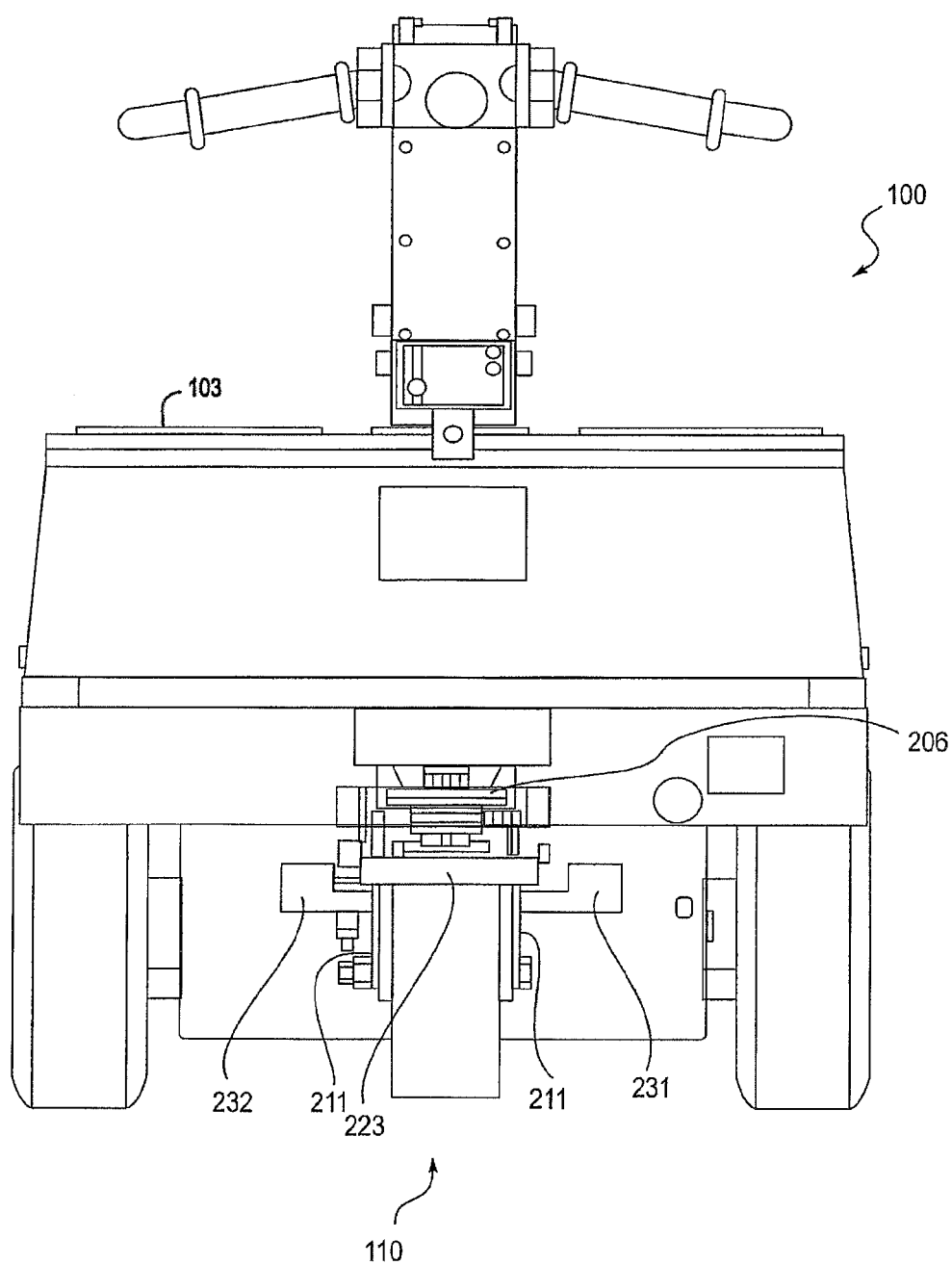
FIG. 3c is a front view of an example utility machine as in FIG. 3a configured in a steerable tiller mode.

FIGS. 3a, 3b, and 3c depict an example utility machine 100 (left-side view, right-side view, and front view, respectively) in accordance with the present disclosure, configured in a steerable wheel mode. The guide bar 223 is shown in the "down" position (rotated downward at an angular orientation relative to the plane of the yoke plate 206), thus being in direct contact with the caster yoke 211. It is noted that the positioning of the yoke plate 206 with respect to the turn center plate 221 may be such that when the tiller 101 is rotated to approximately either sixty degrees left or right of center, contact of the guide bar 223 and the yoke plate 206 with the outer edge of the turn center plate 221 can prevent further rotation beyond the approximately sixty degrees left or right of center.

Figure 3D:
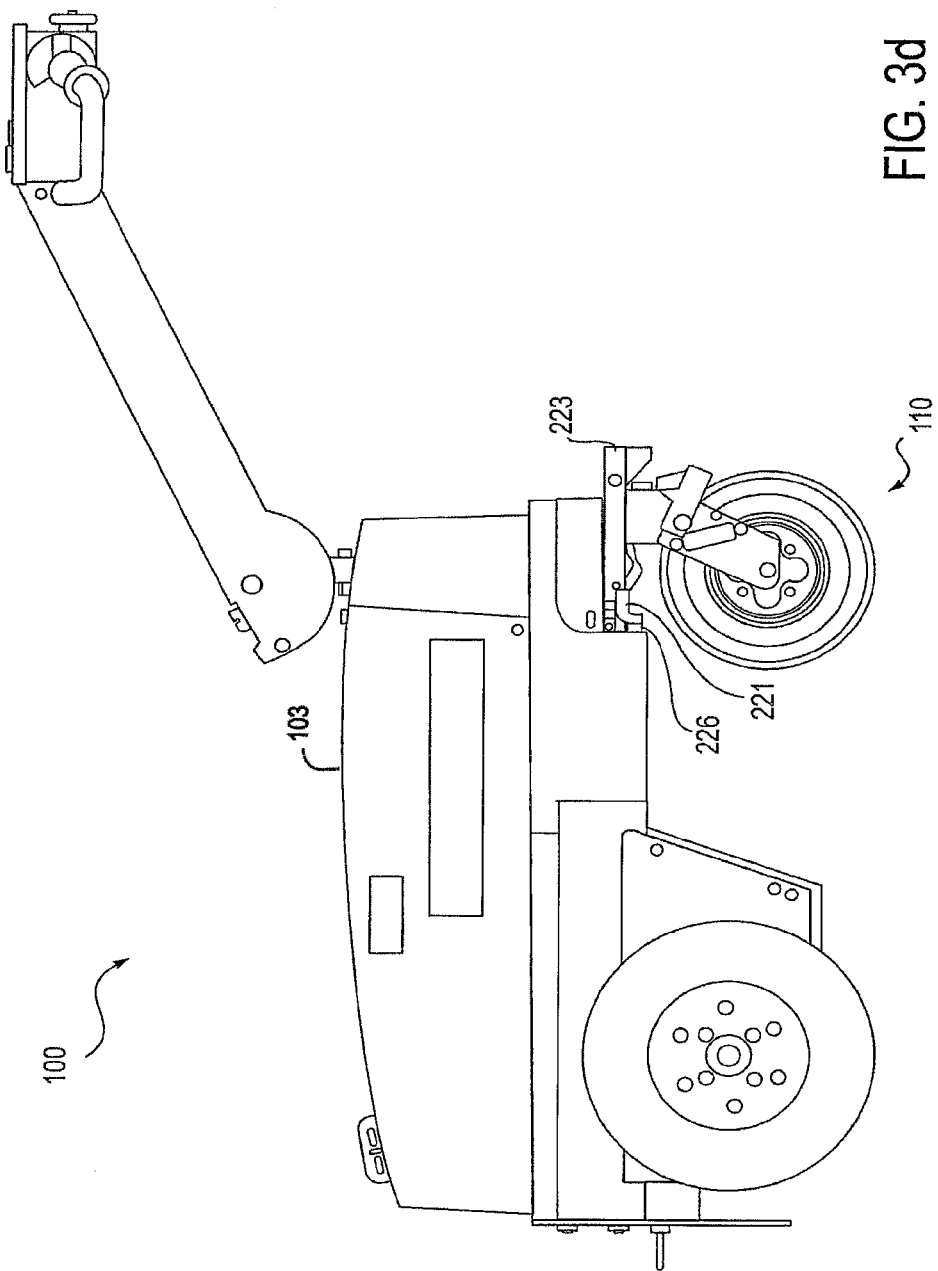
FIG. 3d is a left-side view of an example utility machine as in FIG. 3a configured in a fixed tiller mode.
Figure 3E:
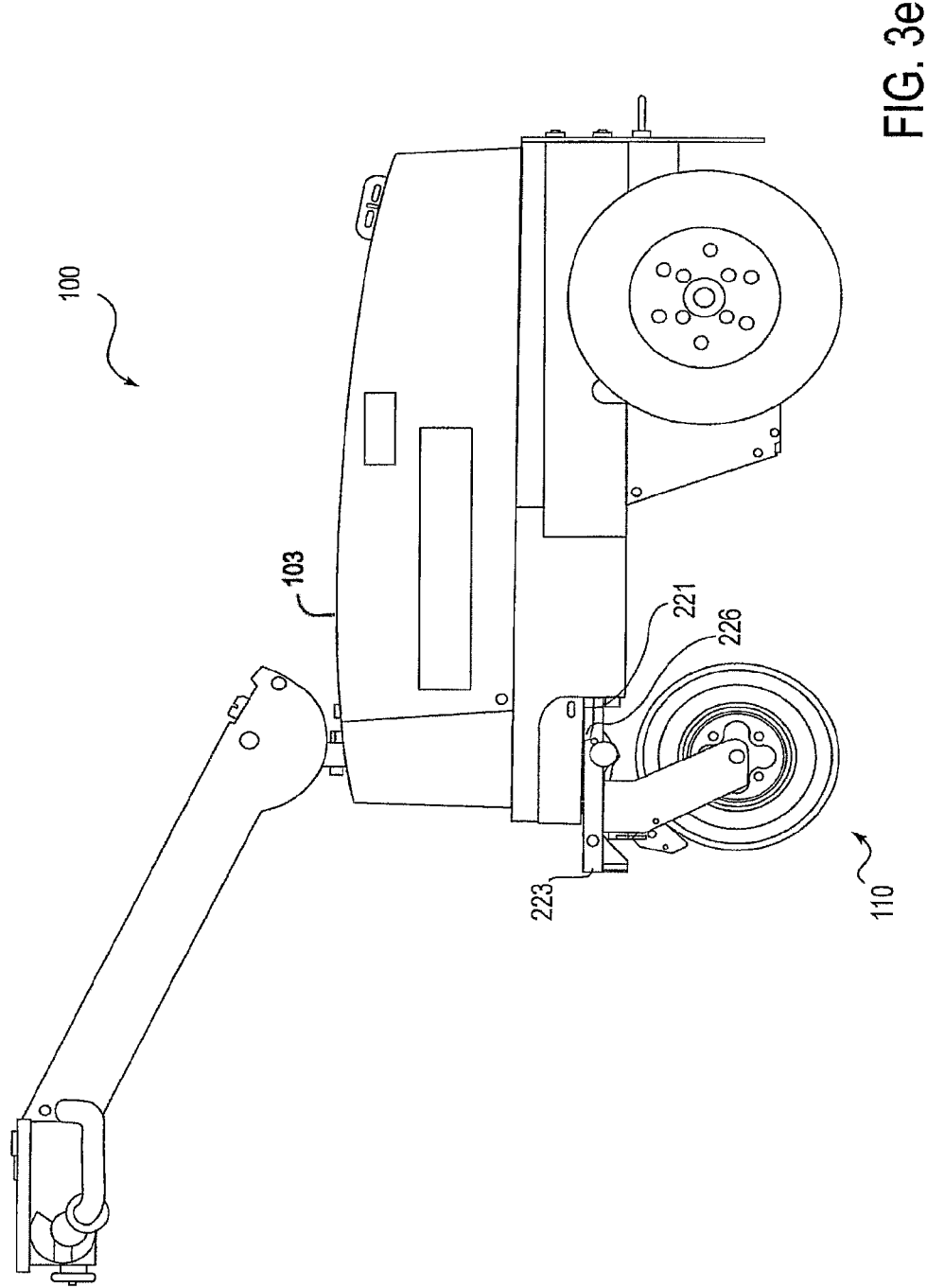
FIG. 3e is a right-side view of an example utility machine as in FIG. 3a configured in a fixed tiller mode.
Figure 3F:
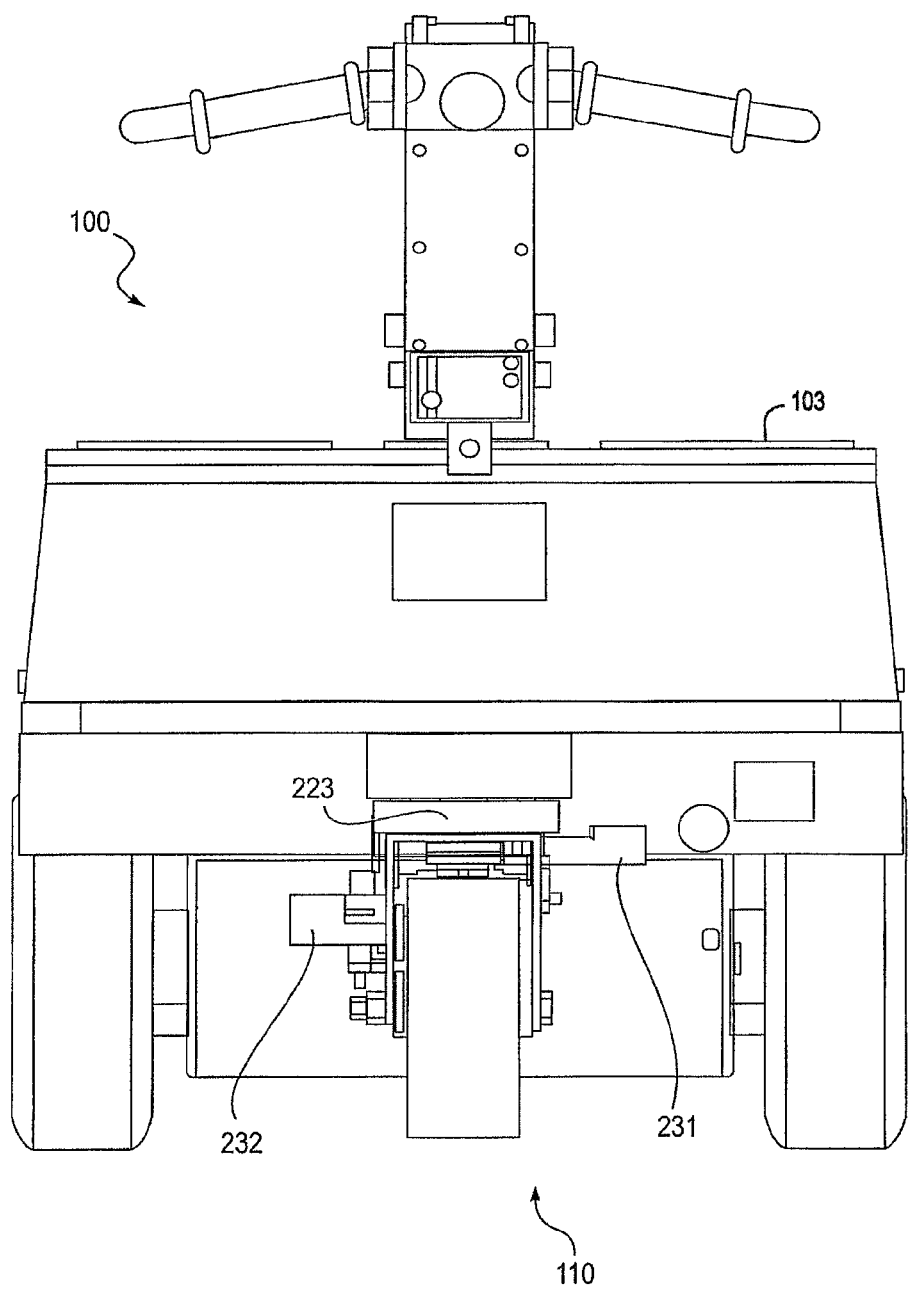
FIG. 3f is a front view of an example utility machine as in FIG. 3a configured in a fixed tiller mode.

FIGS. 3d, 3e, and 3f depict an example utility machine 100 (left-side view, right-side view, and front view, respectively) in accordance with the present disclosure, configured in a caster wheel mode. The guide bar 223 is show in the "up" position (rotated upward and parallel to the plane of the yoke plate 206), thus engaging the stepped ends of the guide bar 223 with the turn center plate 221.

It should be noted that all directional references set forth herein (e.g., upper, lower, upward, downward, left, right, leftward, rightward, top, bottom, above, below, vertical, horizontal, clockwise, and counterclockwise) are relative and only used for identification purposes to aid the reader's understanding of the embodiments of the present invention, and are not limitations, particularly as to the position, orientation, or use of the invention unless specifically set forth in the claims. References to any joinder of elements (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

The invention claimed is:

1. An apparatus for transporting carts comprising:
   a. a machine body comprising a housing comprising a housing opening;
   b. a steering control arranged on the body;
   c. a steering pedestal pivotally arranged with respect to the body;
   d. at least one caster;
   e. a substantially vertical tiller yoke disposed through the housing opening and configured to rotate freely relative to the body;
   f. a hitch positioned on the body opposite said steering pedestal and adapted to engage a cart; and
   h. a selection mechanism adapted to be selectively coupleable between the body and the steering pedestal providing for a caster mode and a steering mode respectively,
   wherein in steering mode, the steering pedestal is operably coupled to the caster by way of the tiller yoke such that a change in pivotal direction of the steering pedestal relative to the machine body causes a substantially corresponding change in the pivotal direction of the at least one caster relative to the machine body.

2. The apparatus of claim 1, wherein the selection mechanism includes a pivoting selector pivotally positionable between a body engaging position and a pedestal engaging position.

3. The apparatus of claim 2, wherein the body engaging position provides the caster mode and the pedestal engaging position provides the steering mode.

4. The apparatus of claim 2, wherein the body further comprises a fixing element, the fixing element being engageable with the pivoting selector in a body engaging position.

5. The apparatus of claim 4, wherein the fixing element comprises a turn center plate.

6. The apparatus of claim 5, wherein the turn center plate further comprises a centering notch and wherein the body engagement feature includes a stepped feature adapted to engage the centering notch.

7. The apparatus of claim 6, wherein the pivoting selector includes a body engagement feature adapted to engage the fixing element.

8. The apparatus of claim 1 wherein the steering control further comprises a tiller and yoke plate.

9. The apparatus of claim 8, wherein the pivoting selector comprises a guide bar, the guide bar further comprising a first leg and a second leg and a cross bar.

10. The apparatus of claim 9, wherein the guide bar further comprises a latch end and a pivot end.

11. The apparatus of claim 10, further comprising a locking latch adapted to engage the pivoting selector.

12. The apparatus of claim 2, further comprising a locking latch adapted to engage the pivoting selector and a pedal pivotally positioned on the steering pedestal, the locking latch being positioned on the pedal, wherein depressing the pedal releases the pivoting selector.

13. The apparatus of claim 12, further comprising a biasing mechanism configured to bias the pivoting selector in a body engaging position, wherein depressing the pedal pivotally disengages the locking latch from the pivoting selector and the biasing mechanism causes the pivoting selector to rotate into the body engaging position.

14. The apparatus of claim 6, wherein in caster mode, the stepped up feature is disengaged from the centering notch.

15. The apparatus of claim 14, further comprising a control interface.

16. The apparatus of claim 1, wherein the steering pedestal comprises a caster having a caster wheel and a caster yoke.

17. An apparatus for transporting carts comprising:
   a. a machine body comprising:
      i. a housing; and
      ii. a housing opening;
   b. a steering control arranged on the body;
   c. a steering pedestal pivotally arranged with respect to the body;
   d. a hitch positioned on the body opposite said steering pedestal and adapted to engage a cart;
   e. a substantially vertical tiller yoke disposed through the housing opening and in rotational communication with the steering pedestal; and
   f. a means for selectively coupling between a steerable mode and a caster mode, wherein,
      i. the steerable mode includes coupling the steering control to the steering pedestal while allowing the each of the steering control and steering pedestal to rotate freely with respect to the body and
      ii. the caster mode includes coupling the steering control to the body to prevent rotation of the steering control while freeing the steering pedestal allowing free rotation of the steering pedestal.

18. The apparatus of claim 17, wherein the means for selectively coupling is pivotally positioned on the steering control and the steering pedestal is rotatably connected to the steering control.

19. A method of using a dual mode utility machine comprising:
   a. depressing a first lever thereby engaging a pivoting selector into a steering pedestal engaging position and controlling the direction of the machine by rotatably manipulating a tiller operationally connected to a caster by way of a substantially vertical tiller yoke which is disposed through a housing opening and configured to rotate freely relative to the body; and
   b. depressing a second lever thereby disengaging the pivoting selector from a steering pedestal engaging position to a body engaging position and controlling the direction of the machine by pushing and/or pulling a machine from side to side by way of a fixed tiller.

20. The method of claim 19, wherein the pivoting selector includes a guide bar pivotally positioned on a yoke plate and adapted to selectively engage the steering pedestal or the body of the utility machine.

* * * * *